United States Patent [19]

Albergo et al.

[11] Patent Number: 5,133,625
[45] Date of Patent: Jul. 28, 1992

[54] METHOD AND APPARATUS FOR SUBSURFACE BIOREMEDIATION

[76] Inventors: Nicholas Albergo, 16101 East Lani Burrell Dr., Lutz, Fla. 33549; Philip B. Hildebrand, 541 Ventris Crt., Maitland, Fla. 32751; William E. Lee, III, P.O. Box 1408, 809 Old Darby St., Seffner, Fla. 33584

[21] Appl. No.: 483,469

[22] Filed: Feb. 22, 1990

[51] Int. Cl.⁵ .................... E21B 43/22; C12N 1/26
[52] U.S. Cl. .................... 405/263; 405/128; 405/258; 166/246; 166/305.1; 111/118; 210/922
[58] Field of Search ............... 405/129, 263, 269, 128, 405/258; 166/64, 246, 305.1, 250; 210/747, 922; 111/118, 903

[56] References Cited

U.S. PATENT DOCUMENTS

| | | | |
|---|---|---|---|
| 1,422,831 | 7/1922 | Camp | 405/269 X |
| 3,546,886 | 12/1970 | Jones et al. | 405/269 |
| 4,102,394 | 7/1978 | Botts | 166/64 X |
| 4,108,722 | 8/1978 | Stover | 166/246 |
| 4,233,015 | 11/1980 | Teague et al. | 405/263 |
| 4,387,770 | 6/1983 | Hill | 166/305.1 |
| 4,521,515 | 6/1985 | Hata | 210/922 X |
| 4,721,158 | 1/1988 | Merritt et al. | 166/250 |
| 4,799,545 | 1/1989 | Silver et al. | 166/246 |
| 4,804,050 | 2/1989 | Kerfoot | 175/21 X |
| 4,807,707 | 2/1989 | Handley et al. | 175/21 X |
| 4,953,618 | 9/1990 | Hamid et al. | 166/250 |

Primary Examiner—David H. Corbin
Assistant Examiner—John Ricci
Attorney, Agent, or Firm—Dominik, Stein, Saccocio, Reese, Colitz & Van Der Wall

[57] ABSTRACT

A system and method for establishing, maintaining or enhancing microorganisms utilized to remediate contaminated soil or groundwater which includes of a direct push rod or cylinder equipped with a fluid or gas delivery system. The system also includes computer-based monitoring capabilities which can monitor or control the subsurface events. Microorganisms, nutrient solutions, or gases such as air can be introduced into the subsurface environment of predetermined locations. The delivery device is a long rod or cylinder which is pushed into the ground via applied pressure at the surface. The internals of this device contain tubing or other means to deliver fluid through openings in the rod or cylinder to the surrounding environment. The fluid may be driven into the environment by surface pumps or gas pressure. The delivery rod or cylinder may be withdrawn for reutilization or left in place for continuous service.

2 Claims, 3 Drawing Sheets

METHOD AND APPARATUS FOR SUBSURFACE BIOREMEDIATION

BACKGROUND OF THE INVENTION

1. Summary of the Invention

This invention relates to a method and apparatus for use in the application of subsurface bioremediation and, more particularly, for use in establishing, maintaining and enhancing microorganisms as a method to restore the quality of contaminated groundwater or soil.

2. Description of the Background Art

The increasing contamination of subsurface groundwater is an alarming reality. This contamination is increasing largely due to industrial, commercial and agricultural practices which are ecologically unsound.

In the past, wells were utilized to extract a quantity of groundwater in order to determine the extent of the contamination. Such use of a well was developed to extract ground water samples from beneath the surface, bringing the sample above ground for analysis. Thereafter, subsequent remedial action was performed. The equipment for effecting groundwater clean-up is normally complex and often only marginally effective. The extraction of contaminated groundwater to above-ground locations increases the possibility of introducing the contaminants to previously uncontaminated areas. In addition, the testing and remediating of such extracted samples is not as reliable as the in situ testing and remediating of the groundwater at its original depth and location.

Various approaches are utilized commercially to extract ground water and soil gases for testing and are disclosed in the literature. By way of example, note U.S. Pat. Nos. 3,084,553 to Cullinan; 4,804,050 to Kerfoot; and 4,807,707 to Handley which disclose probes for the extraction of subsurface liquids. In addition, U.S. Pat. No. 4,043,407 to Wilkens discloses on-site measuring which is performed without carrying a sample to the surface. The sampling probes of these patents are of relatively complex designs and are for receiving groundwater or soil vapor rather than dispensing or injecting microorganisms and other liquids and gases into them. Lastly, U.S. Pat. No. 2,779,195 to Simon discloses the simple injecting of chemicals into subsurface locations while U.S. Pat. No. 4,824,193 discloses the simple injecting of chemicals with steam into subsurface locations.

Although many such advances are made to one extent or another none achieves the objectives of an efficient, reliable, inexpensive, convenient to use method and apparatus for subsurface bioremediation as set forth herein to accommodate the growing needs for expedient clean-up methods to address increasing groundwater contamination throughout the United States and abroad.

As illustrated by the great number of prior patents and known commercial techniques, efforts continue in an attempt to remediate contaminated soil or groundwater more efficiently, reliably, inexpensively and conveniently. None of these previous efforts, however, provides the benefits attendant with the present invention. Additionally, prior techniques do not suggest the present inventive combination of component elements as disclosed and claimed herein. The present invention achieves its intended purposes, objectives and advantages over the prior art through a new, useful and unobvious combination of method steps and claimed components which is simple to use, with the utilization of a minimum number of functioning parts, at a reasonable cost to manufacturers, and by employing only readily available materials.

Therefore, it is an object of this invention to provide a method and apparatus for delivering a fluid to a subsurface location comprising a cylindrical head having an internal central cavity, a pointed lower end adapted to penetrate the soil, and an upper end with an opening in communication with the cavity, the head also having radial apertures extending from the cavity to exterior of the head; a hollow cylindrical push rod releasably couplable at its lower end to the upper end of the head in axial alignment therewith; drive means to exert an axial force to the upper end of the rod to thereby cause the push rod and head to move into the soil; a source of fluid; a hollow umbilical cord coupling the source of fluid and the cavity of the head; a screen covering the ends of the apertures at the exterior surface of the head; pressure means to effect a flow of fluid from the source, through the cord, to the cavity and through the apertures and screen into the subsurface location; and control means to sense the temperature, pressure and flow of the fluid through the umbilical cord and thereby adjust the pressure means in response thereto.

It is a further object of the invention to inject a microorganism seed stock or bioremediation fluid into groundwater or soils.

It is a further object of the invention to monitor the flow of injected microorganism seed stock into groundwater or soils.

It is a further object of the invention to control the flow of monitored microorganism seed stock being injected into groundwater or soils.

Lastly it is an object of the present invention to establish, maintain and enhance microorganisms utilized to remediate groundwater or soils contamination through the injection of nutrients and gases using the same system.

The foregoing has outlined some of the more pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into a method of delivering a fluid to a subsurface location comprising providing a cylindrical head having an internal central cavity, a pointed lower end adapted to penetrate the soil, and an upper end with an opening in communication with the cavity, the head also having radial apertures extending from the cavity to exterior of the head; releasably coupling the lower end of a hollow cylindrical push rod to the upper end of the head in axial alignment therewith; exerting an axial force to the upper end of the rod to drive the push rod and head into the soil; coupling a source of bioremedial fluid to the cavity of the head through a hollow umbilical cord; covering the ends of the apertures at the exterior surface of the head with a screen; applying pressure to effect a flow of fluid from the source, through the cord, to the cavity and through the apertures and screen into the subsurface location; sensing the pressure, temperature and flow of the fluid through the umbilical cord; and adjusting the applied pressure in response to the sensed temperature, pressure and flow.

The invention may also be incorporated into a method of delivering fluid to a subsurface location comprising providing a head having an internal cavity, a first leading end to penetrate the soil, and a second end with an opening in communication with the cavity, the head also having aperture means extending from the cavity to exterior of the head; exerting a force to the upper end of the head to effect its movement to the subsurface location; coupling a source of fluid to the cavity of the head through a hollow umbilical cord; effecting a flow of fluid from the source into the subsurface location; sensing the flow of fluid; and adjusting the flow of fluid in response to the sensing.

The fluid may be a viable microorganism culture. The fluid may contain nutrients and other materials to sustain microorganisms. The fluid may be a gas for maintaining an aerobic and anaerobic condition. The fluid may be microorganisms introduced into the subsurface location and which microorganisms were previously cultured above ground. The fluid may be gases introduced into the subsurface location to enhance the growth of ambient organisms.

The method further includes the step of driving the head into the ground with push rod means wherein the push rod means are retained in association with the head during the introduction of fluids or are withdrawn from the head after driving the head to the subsurface location. The sensing is fed to a controller which receives the sensed conditions of the flow of fluid. The sensed conditions include temperature, pressure and flow rate and may further include the step of recording the sensed conditions. The method may further include the step of adjusting the flow of fluid from the controller in response to the conditions of the flow of fluid or the step of adjusting the flow of fluid from the controller in response to software dictated by a controller.

The invention may be incorporated into a system for delivering a fluid to a subsurface location comprising a cylindrical head having an internal central cavity, a pointed lower end adapted to penetrate the soil, and an upper end with an opening in communication with the cavity, the head also having radial apertures extending from the cavity to exterior of the head; a hollow cylindrical push rod releasably couplable at its lower end to the upper end of the head in axial alignment therewith; drive means to exert an axial force to the upper end of the rod to thereby cause the push rod and head to move into the soil; a source of fluid; a hollow umbilical cord coupling the source of fluid and the cavity of the head; a screen covering the ends of the apertures at the exterior surface of the head; pressure means to effect a flow of fluid from the source, through the cord, to the cavity and through the apertures and screen into the subsurface location; and control means to sense the temperature, pressure and flow of the fluid through the umbilical cord and thereby adjust the pressure means in response thereto.

The invention may be incorporated into apparatus for delivering a fluid to a subsurface location comprising a head having an internal cavity, a pointed first end adapted to penetrate the soil, and a second end with an opening in communication with the cavity, the head also having apertures extending from the cavity to exterior of the head; drive means to exert a force to the second end of the head to thereby cause the head to move to the subsurface location; a source of fluid; a hollow umbilical cord coupling the source of fluid and the cavity of the head; means to effect a predetermined flow of fluid through the cord from the source to the head into the subsurface location; and control means for sensing and varying the flow of fluid.

The apparatus further includes push rods couplable at a first end to the second end of the head and means to drive the push rods and head to subsurface location. The means to effect a predetermined flow is a pump for varying the pressure to the fluid flow. The apparatus further includes a valve means to vary the flow of fluid. The control means include a flow sensor, pressure sensor, and temperature sensor and means for recording the output of such sensors. The means to effect a predetermined flow may be controlled by software dictated by the control means or it may be controlled by the sensed flowing fluid, specifically, the pressure, temperature and flow of fluid.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which.

Similar reference characters refer to similar parts throughout the various Figures.

DETAILED DESCRIPTION OF THE INVENTION

Figure 1:
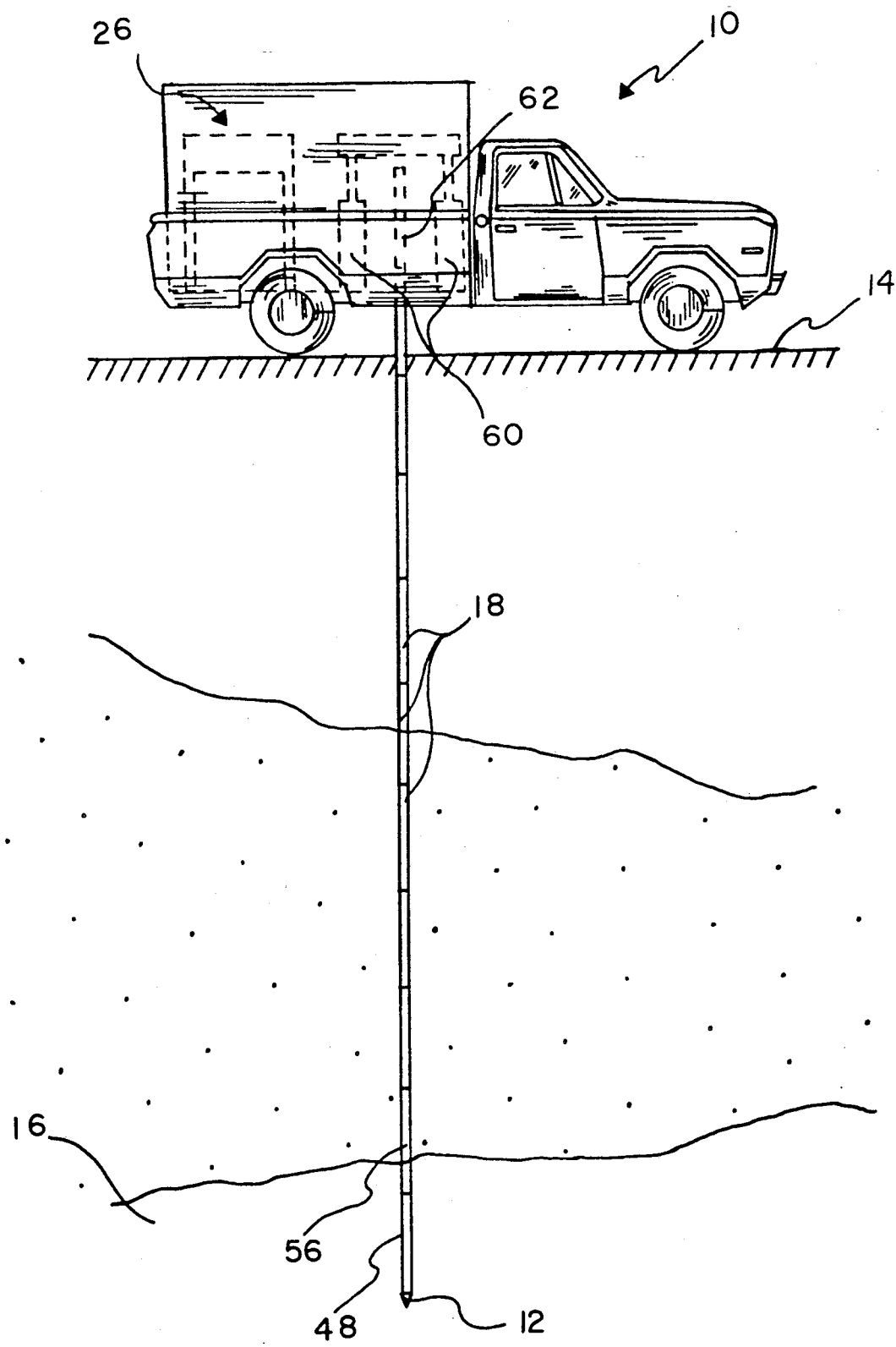
FIG. 1 is a schematic illustration of a system constructed in accordance with the present invention, the system having been deployed for controlling injected microorganism seed stock and associated growth enhancement agents into the groundwater in accordance with the method of practicing the present invention.
Figure 2:
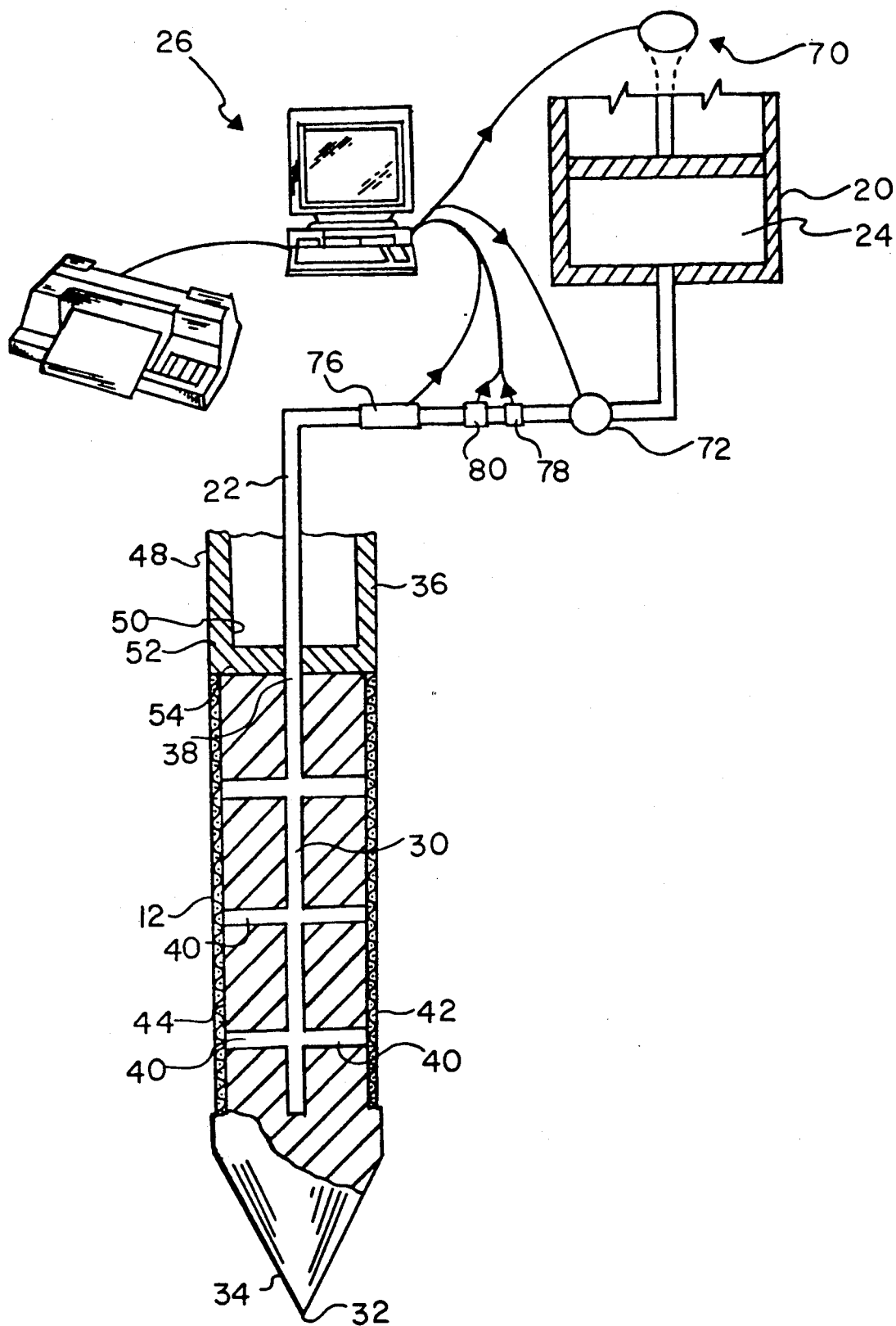
FIG. 2 is an enlarged view of the lower portion of the apparatus shown in FIG. 1 with a schematic illustration of the associated mechanisms for monitoring and controlling the flow of microorganism seed stock and associated cell growth enhancement agents.
Figure 3:
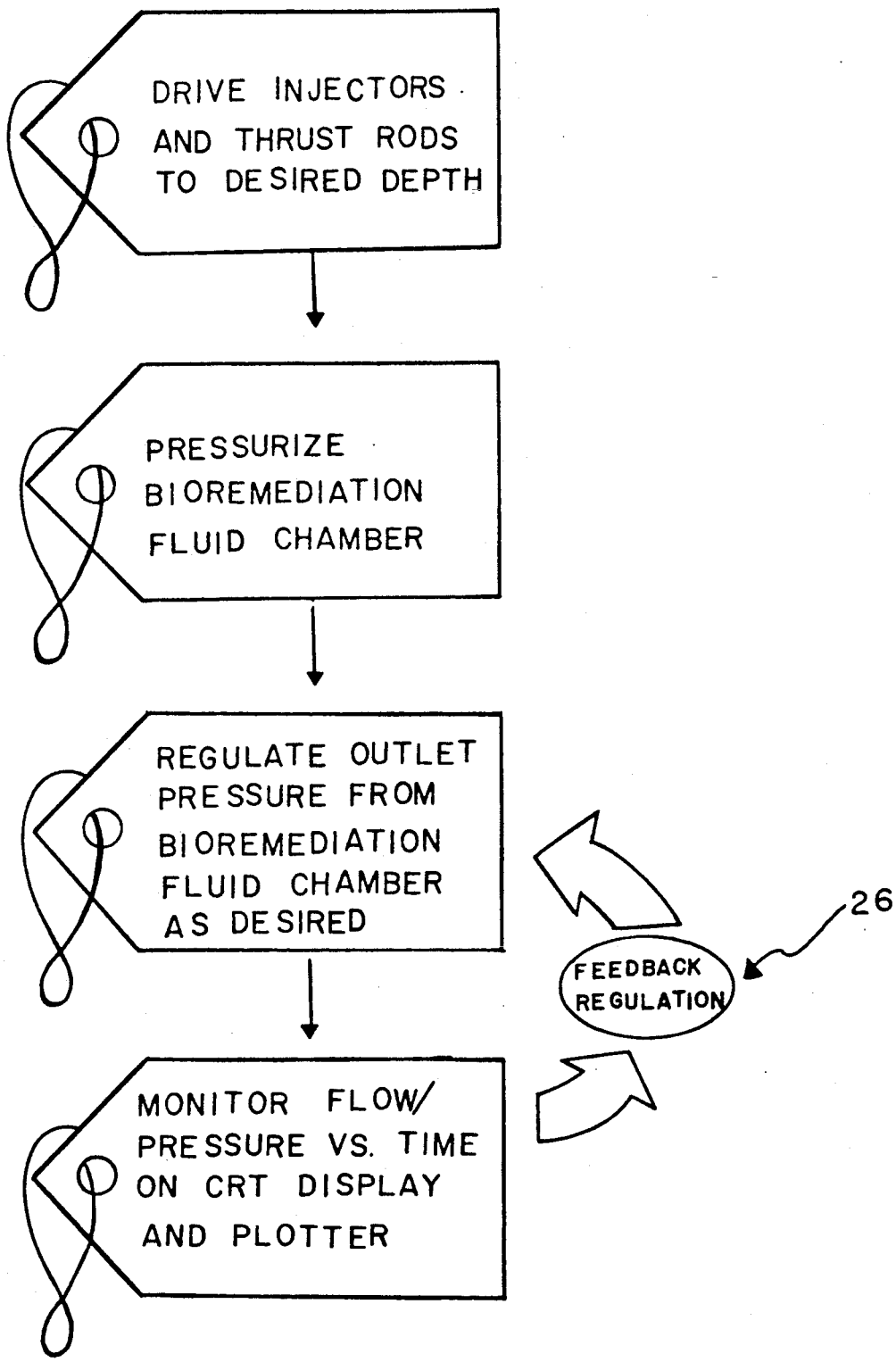
FIG. 3 is a flow diagram of the steps in carrying out the method of the present invention.

With particular reference to FIG. 1, there is shown a schematic illustration of a bioremedial system 10 constructed in accordance with the principles of the present invention. The system includes a head 12 for penetrating the ground 14 above the groundwater 16 to be treated, a cylindrical push rod 18 for driving the head 12 into the ground, a source 20 of microorganism seed stock or for treating the contaminated groundwater, an umbilical cord 22 coupling the head 12 and the source 20 for the delivering of the fluid 24, liquid or gas or mixture thereof, and control means 26 for sensing the flow of fluid and for controlling the fluid and nutrient needs in response to the sensed conditions.

The head is cylindrical in configuration. It is fabricated of a rigid material, preferably a tooled steel. It has an internal central cavity 30. On its exterior, there is a point 32 at its lower end 34 which is adapted to facilitate the penetration of the soil above the groundwater to be treated. At its upper end 36 is an opening 38 in communication with the cavity. Extending radially, or essentially radially, from the cavity are apertures 40 which communicate with the exterior of the head. A cylindrical screen 42 surrounds the cylindrical portion of the head and covers the ends of the apertures at the exterior surface 44 of the head 12.

A first hollow cylindrical push rod 48 is releasably coupled at its lower end 50 to the upper end 36 of the head 12. Cooperable threads 52 and 54 effect the releasable coupling. The push rod and head are in axial alignment. Additional push rods 56, 18 are threaded, one to another, to form an assembly extending from above the ground to a predetermined depth corresponding to the depth of the groundwater to be treated.

Pneumatic cylinders 60 are positioned to function as drive means to exert an axial force to the upper end of the uppermost rod 62. In this manner, the uppermost rod 62 will be driven into the ground. Thereafter, another rod is attached thereto; and that additional rod 18, is driven downwardly to the top of the ground. This procedure is repeated until the head reaches the predetermined depth. The point at the lower end of the head facilitates the driving down of the head and rods into the soil.

A hollow umbilical cord 22, fabricated of a flexible, impermeable material, couples a container or other source 20 of fluid 24 and the cavity 30 of the head. The fluid 24 is preferably a mixture of microorganisms and nutrients (mo/nutrients) which are to be injected into the ground and are placed under pressure and pumped down the umbilical cord and out the injector. The material injected into the ground may consist of microorganisms, nutrients, gases, liquids of any type, chemicals or any other substance. This is of some importance since in some cases the bioremediation may be an anaerobic or aerobic process. Also, in some cases there will be a necessity to inject oxygen, or chemicals under these procedures.

The apparatus includes the ability to inject microorganisms into the subsurface environment in a controlled manner. These microorganisms can be previously cultured above ground. The apparatus also includes the ability, where fluid or gase are introduced into the subsurface environment, to enchance the growth of ambient organisms. This is a different bioremediation technique. The apparatus yet further includes the ability to inject fluid or gases into the subsurface environment to enhance the growth of previously introduced microorganisms.

A pump or other pressure means 70 is operatively associated with the source of fluid. The pump 70 functions to generate a variable force to effect a flow of fluid 24 from the source 20, through the umbilical cord 22, to the cavity 30 and through the apertures 40 and screen into the subsurface location where the contaminated groundwater 16 is to be treated. A valve 72 is located along the path of flow of the fluid to control its flow rate as an alternate or supplemental to the pump 70.

If desired, the push rods 18, 46, 56 and 62 used to drive the head 12 to its desired depth, can be pulled out and the opening grouted as necessary. The head can then be left in the ground. Also, the dimensions of the head, in particular its length, can be varied as desired by adding other modular sections. The length of the injector is of some consequence in order to enable the mo/nutrient mixture to be injected over an entire zone which has been pre-determined. As can be understood, the system is extremely simple in its concept. However, it is a major improvement over anything available to date.

The head 12 and rods, the injector, can be thrust into the soil using the thrust rods or it can be lowered down pre-drilled holes or placed inside existing wells. All that is necessary when it is at the required depth is that a hydraulic seal be developed at, or above, releasable coupling. It is necessary to create a hydraulic seal so that the mo/nutrient solution can be injected under pressure into the groundwater.

The injector, head and rods, can be thrust into the ground using drill rods or connected directly to Teflon tubing or any other hollow pipe as long as the umbilical cord can rise to the surface.

The injector can be inserted into the ground and left connected to the drill rods or, if required, the drill rods can be removed and the annular space above the injector can be grouted to provide a hydraulic seal. For existing monitoring wells or other openings into the soil, the device can be lowered down a hole and grouted in place.

Control means 26 are also provided to sense and monitor the pressure, temperature and flow rate of the fluid through the umbilical cord. Such control means include a flow meter 76, a pressure transducer 78 and a temperature transducer 80. The outputs from these sensors 76, 78 and 80 are fed to a control monitor 26 at which an operator may observe the readings. In the preferred embodiment, the outputs are integrated by a digital controller to generate a control signal. The control signal then feeds data to the pump 70 and valve 72 in a preprogrammed manner to vary the flow rate of the fluid to the head. In this manner, a servo-system is established to control the flow of fluid in response to the data and thereby adjust the pressure means in response thereto.

The system can thus be used for injecting microorganisms, nutrients, gases or chemicals into the subsurface environment under a monitored, controlled and variable process as required. Furthermore, all information can be computer 26 stored for review at a later date. The system includes the computer to store and control the sequence of events. The computer reads monitoring equipment including flow rates and pressures and stores this information. It can also be used to regulate the equipment as necessary.

In carrying out the method of the present invention, a cylindrcal head 12 is provided which has an internal central cavity 30, a pointed lower end 34 adapted to penetrate the soil 14, and an upper end 36 with an opening 38 in communication with the cavity 31. The head 12 also has essentially radial apertures 40 extending from the cavity 30 to exterior of the head 12. In addition, a screen 42 is provided for covering the ends of the apertures 40 at the exterior surface 44 of the head 12. The lower end 50 of a hollow cylindrical push rod 48 is releasably coupled to the upper end 36 of the head 12 in axial alignment therewith by threaded ends.

The next step in the practice of the present method is exerting an axial force to the upper end of the rod 48 to drive the push rod 48 and head 12 into the soil 14. Thereafter a source 20 of fluid 24, liquid and/or gas is coupled to the cavity 30 of the head 12 through a hollow umbilical cord 22. A pressure is then applied to the fluid to effect a flow of such fluid from the source 20, through the cord 22, to the cavity 30 and through the apertures 40 and screen 42 into the subsurface location.

The flow of fluid is then sensed, monitored and controlled, preferrably automatically in a servo-loop system. The sensing is of the pressure, temperature and flow of the fluid 24 through the umbilical cord 22. The sensed values are monitored, and a digital controller 26 generates a control signal back to the valve and pressure means to thereby adjust the applied pressure and flow rate in response to the sensed pressure, temperature, and flow rate.

The present invention has been described with respect to a particular preferred embodiment thereof. The invention is not, however, to be construed as so limited, but it is intended to be protected broadly within the spirit and scope of the appended claims.

What is claimed is:

1. A method of delivering a fluid containing viable micro organisms to a subsurface location comprising:

providing a source of fluid containing viable micro organisms;

providing a cylindrical head having an internal central cavity, a pointed lower end adapted to penetrate the soil, and an upper end with an opening in communication with the cavity, the head also having radial apertures extending from the cavity to exterior of the head;

releasably coupling the lower end of a hollow cylindrical push rod to the upper end of the head in axial alignment therewith;

exerting an axial force to the upper end of the rod to drive the push rod and head into the soil;

coupling the source of fluid to the cavity of the head through a hollow umbilical cord;

covering the ends of the apertures at the exterior surface of the head with a screen;

applying pressure to effect a flow of fluid from the source, through the cord, to the cavity and through the apertures and screen into the subsurface location;

sensing the conditions of pressure, temperature and flow of the fluid in the umbilical cord; and adjusting the applied pressure in response to the conditions sensed.

2. A system for delivering a fluid containing viable micro organisms to a subsurface location comprising:

a source of fluid containing viable micro organisms;

a cylindrical head having an internal central cavity, a pointed lower end adapted to penetrate the soil, and an upper end with an opening in communication with the cavity, the head also having radial apertures extending from the cavity to exterior of the head;

a hollow cylindrical push rod releasably couplable at its lower end to the upper end of the head in axial alignment therewith;

drive means to exert an axial force to the upper end of the rod to thereby cause the push rod and head to move into the soil;

a hollow umbilical cord coupling the source of fluid and the cavity of the head;

a screen covering the ends of the apertures at the exterior surface of the head;

pressure means to effect a flow of fluid from the source, through the cord, to the cavity and through the apertures and screen into the subsurface location; and control means downstream from the pressure means to sense the conditions of temperature, pressure and flow of the fluid in the umbilical cord and thereby adjust the pressure means in response to the sensed conditions.

* * * * *